(12) United States Patent
Lafreniere et al.

(10) Patent No.: US 11,042,274 B2
(45) Date of Patent: Jun. 22, 2021

(54) EXTRACTING DEMONSTRATIONS FROM IN-SITU VIDEO CONTENT

(71) Applicant: AUTODESK, INC., San Rafael, CA (US)

(72) Inventors: Benjamin Lafreniere, Kitchener (CA); Tovi Grossman, Toronto (CA); Justin Frank Matejka, Newmarket (CA); George Fitzmaurice, Toronto (CA)

(73) Assignee: AUTODESK, INC., San Rafael, CA (US)

(*) Notice: Subject to any disclaimer, the term of this patent is extended or adjusted under 35 U.S.C. 154(b) by 865 days.

(21) Appl. No.: 14/561,056

(22) Filed: Dec. 4, 2014

(65) Prior Publication Data

US 2015/0160836 A1 Jun. 11, 2015

Related U.S. Application Data

(60) Provisional application No. 61/911,956, filed on Dec. 4, 2013.

(51) Int. Cl.
*G06F 3/0484* (2013.01)
*H04N 21/845* (2011.01)
*G06F 11/34* (2006.01)
*H04N 21/854* (2011.01)
*H04N 21/8549* (2011.01)
*G11B 27/031* (2006.01)
*G11B 27/36* (2006.01)

(52) U.S. Cl.
CPC ...... *G06F 3/04842* (2013.01); *G06F 11/3438* (2013.01); *G11B 27/031* (2013.01); *G11B 27/36* (2013.01); *H04N 21/8456* (2013.01); *H04N 21/854* (2013.01); *H04N 21/8549* (2013.01)

(58) Field of Classification Search
CPC .................................................. H04N 21/8456
See application file for complete search history.

(56) References Cited

U.S. PATENT DOCUMENTS 6,462,754 B1 * 10/2002 Chakraborty ..... G06F 17/30811
707/E17.013
6,751,776 B1 * 6/2004 Gong ................ G06F 17/30616
707/E17.028
7,139,978 B2 * 11/2006 Rojewski .......... G06F 17/30899
707/E17.119

(Continued)

OTHER PUBLICATIONS

StatSoft, "Support Vector Machines (SVM)," Dec. 28, 2009, https://web.archive.org/web/20091228041717/http://www.statsoft.com/textbook/support-vector-machines/.*

(Continued)

*Primary Examiner* — Ryan Barrett
(74) *Attorney, Agent, or Firm* — Artegis Law Group, LLP

(57) ABSTRACT

Embodiments disclosed herein include a method, a non-transitory computer-readable medium, and a system for generating video clips for teaching how to apply a tools in various application programs for editing documents. The method includes identifying one or more characteristic features of a video clip. The method also includes providing the one or more characteristic features to a trained machine learning analysis module. The method further includes evaluating the characteristic features to generate a clip rating. The method also includes determining whether to discard the video clip based on the clip rating.

16 Claims, 6 Drawing Sheets

(56) References Cited

U.S. PATENT DOCUMENTS

| | | | | |
|---|---|---|---|---|
| 8,260,117 | B1* | 9/2012 | Xu | H04N 21/4668 386/262 |
| 8,706,675 | B1* | 4/2014 | Samaniego | G06Q 30/0201 706/52 |
| 8,843,951 | B1* | 9/2014 | Sherrets | H04N 21/472 709/224 |
| 8,942,542 | B1* | 1/2015 | Sherrets | H04N 21/44008 386/241 |
| 9,148,706 | B1* | 9/2015 | Shin | H04N 21/812 |
| 9,459,780 | B1* | 10/2016 | Smith | G06F 11/34 |
| 9,465,435 | B1* | 10/2016 | Zhang | G06F 3/01 |
| 2002/0164151 | A1* | 11/2002 | Jasinschi | G06F 17/30796 386/241 |
| 2004/0221237 | A1* | 11/2004 | Foote | G06K 9/00758 715/700 |
| 2005/0251532 | A1* | 11/2005 | Radhakrishnan | G06F 17/30787 |
| 2008/0120646 | A1* | 5/2008 | Stern | G06Q 30/02 725/34 |
| 2010/0250477 | A1* | 9/2010 | Yadav | G06N 20/00 706/14 |
| 2011/0040760 | A1* | 2/2011 | Fleischman | G06Q 30/02 707/737 |
| 2011/0218997 | A1* | 9/2011 | Boiman | G11B 27/28 707/737 |
| 2012/0189284 | A1* | 7/2012 | Morrison | G06F 17/30265 386/282 |
| 2013/0227350 | A1* | 8/2013 | O'Riordan | G06F 11/3476 714/45 |
| 2013/0259399 | A1* | 10/2013 | Ho | G06F 17/30825 382/276 |
| 2014/0068433 | A1* | 3/2014 | Chitturi | H04N 21/41407 715/716 |
| 2014/0072285 | A1* | 3/2014 | Shynar | G11B 27/031 386/286 |
| 2014/0095979 | A1* | 4/2014 | Meckler | G06F 17/2247 715/234 |
| 2014/0108911 | A1* | 4/2014 | Damale | H04L 67/10 715/234 |
| 2014/0108931 | A1* | 4/2014 | Howard | G06T 11/60 715/716 |
| 2014/0321831 | A1* | 10/2014 | Olsen | G11B 27/034 386/241 |
| 2014/0328570 | A1* | 11/2014 | Cheng | G11B 27/10 386/241 |
| 2014/0333421 | A1* | 11/2014 | Phang | G08C 17/02 340/12.54 |
| 2014/0363138 | A1* | 12/2014 | Coviello | G11B 27/28 386/241 |
| 2015/0189343 | A1* | 7/2015 | Lee | H04N 21/25435 725/1 |
| 2015/0217196 | A1* | 8/2015 | McCarthy | A63F 13/497 463/24 |
| 2016/0034786 | A1* | 2/2016 | Suri | G06K 9/6256 382/159 |
| 2016/0292510 | A1* | 10/2016 | Han | G06K 9/00724 |
| 2017/0065888 | A1* | 3/2017 | Cheng | A63F 13/497 |
| 2017/0132785 | A1* | 5/2017 | Wshah | G06T 7/0012 |

OTHER PUBLICATIONS

"Adobe Labs Tutorial Builder" http://labs.adobe.com/technologies/tutorialbuilder/.

Banovic, et al., "Waken: Reverse Engineering Usage Information and Interface Structure from Software Videos", ACM UIST '12, (2012), pp. 83-92.

Carroll, "The Nurnberg Funnel: Designing Minimalist Instruction for Practical Computer Skill", MIT Press, 1990, 5 pages.

Chi, et al., "MixT: Automatic Generation of Step-by-Step Mixed Media Tutorials", ACM UIST '12, Oct. 7-10, 2012, pp. 93-102.

Denning, et al., "MeshFlow: Interactive Visualization of Mesh Construction Sequences", ACM Trans. Graph. 30, 4, 2011, pp. 66:1-66:8.

Evans, et al., "Taming Wild Behavior: The Input Observer for Obtaining Text Entry and Mouse Pointing Measures from Everyday Computer Use", ACM CHI '12, 2012, pp. 1947-1956.

Gajos, et al., "Accurate Measurements of Pointing Performance from In Situ Observations", ACM CHI '12, 2012, pp. 3157-3166.

Grabler, et al., "Generating photo manipulation tutorials by demonstration", ACM Trans. Graph. 28, 3, pp. 66:1-66:9.

Grossman, et al., "A Survey of Software Learnability: Metrics, Methodologies and Guidelines", ACM CHI '09, 2009, pp. 649-658.

Grossman, et al., "ToolClips: An Investigation of Contextual Video Assistance for Functionality Understanding", ACM CHI '10, 2010, pp. 1515-1524.

Grossman, et al., "Chronicle: Capture, exploration, and playback of document workflow histories", ACM UIST '10, pp. 143-152.

Harrison, "A Comparison of Still, Animated, or Nonillustrated On-Line Help with Written or Spoken Instructions in a Graphical User Interface", ACM CHI '95, 1995, pp. 82-89.

Kelleher, et al., "Stencils-Based Tutorials: Design and Evaluation", ACM CHI '05, pp. 541-550.

Kim, et al., "Learnersourcing Subgoal Labeling to Support Learning from How-to Videos", CHI '13 Ext. Abstracts, ACM, 2013, pp. 685-690.

Knabe, "Apple Guide: A Case Study in User-Aided Ddesign of Online Help", CHI '95 Conference Companion, ACM 1995, pp. 286-287.

Lafreniere, et al., "Characterizing Large-Scale Use of a Direct Manipulation Application in the Wild", GI '10, pp. 11-18.

Lafreniere, et al., "Community Enhanced Tutorials: Improving Tutorials with Multiple Demonstrations", ACM CHI '13, 1779-1788.

Lazar, et al., "Workplace user frustration with computers: an exploratory investigation of the causes and severity", Behaviour & Information Technology, vol. 25, No. 3, May-Jun. 2006, pp. 239-251.

Matejka, et al., "Ambient Help", CHI 2011—Session: Shortcuts Commands & Expertise, May 7-12, 2011, pp. 2751-2760.

Matejka, et al., "CommunityCommands: Command Recommendations for Software Applications", ACM UIST '09, 2009, pp. 193-202.

McGrenere, et al., ""Are We All in the Same "Bloat"? Proc. of GI '00, 2000, pp. 187-196.

Obendorf, et al., "Web Page Revisitation Revisited: Implications of a Long-term Click-stream Study of Browser Usage", ACM CHI '07, 2007, pp. 597-606.

Palmiter, et al., "Animated Demonstrations vs Written Instructions for Learning Procedural Tasks: A Preliminary Investigation", Int. J. Man-Mach. Stud. 34, 5,(1991, pp. 687-701.

Pongnumkul, et al., "Pause-and-Play: Automatically Linking Screencast Video Tutorials with Applications", ACM UIST '11, 2011, pp. 135-144.

* cited by examiner

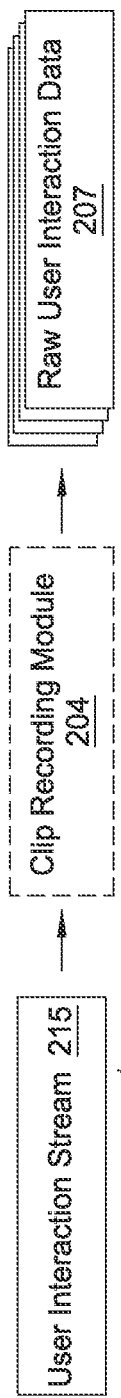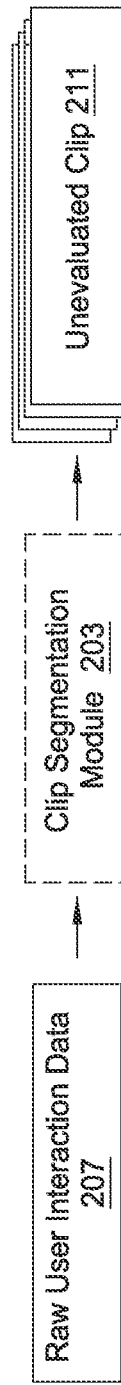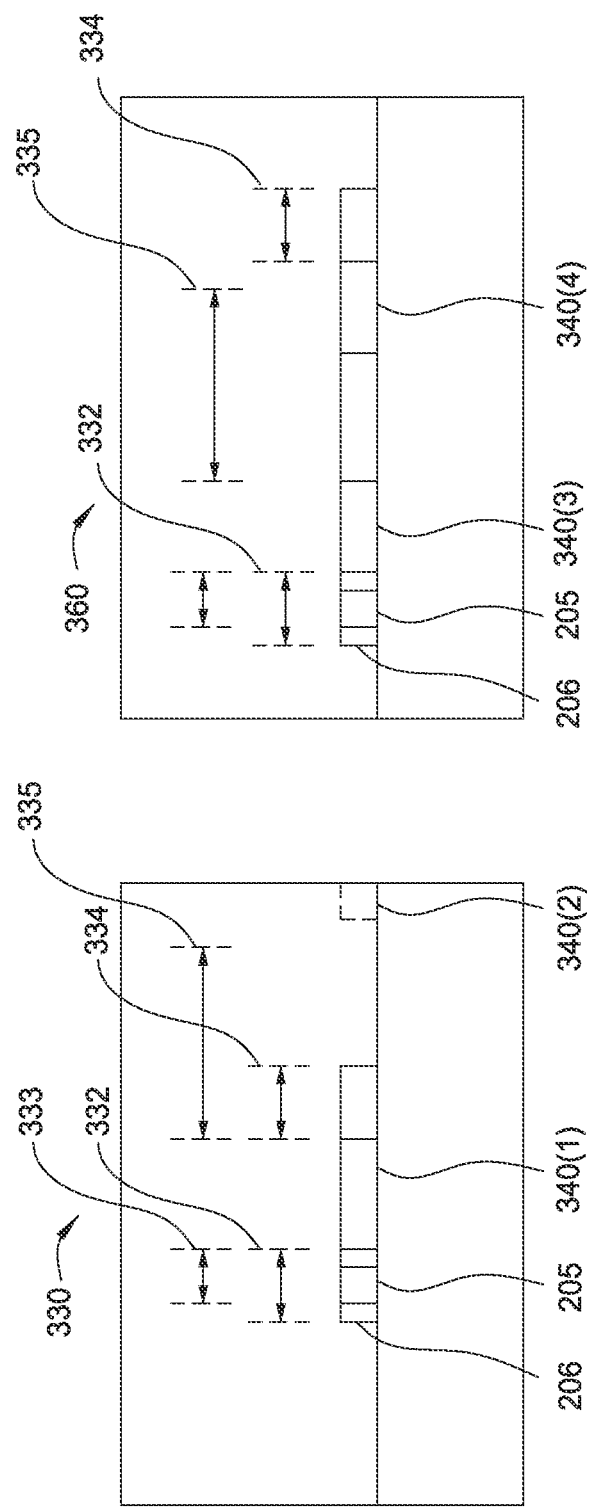

EXTRACTING DEMONSTRATIONS FROM IN-SITU VIDEO CONTENT

CROSS-REFERENCE TO RELATED APPLICATIONS

This application claims the priority benefit of U.S. provisional patent application Ser. No. 61/911,956, filed Dec. 4, 2013, and titled, DEVELOPING SOFTWARE TOOL DEMONSTRATIONS FROM ACTUAL USER IMPLEMENTATIONS." The subject matter of this related application is hereby incorporated herein by reference.

BACKGROUND OF THE INVENTION

Field of the Invention

The invention relates generally to video processing and, more specifically, extracting demonstrations from in-situ video content.

Description of the Related Art

Many powerful, feature rich software applications for allowing users to create and edit content exist. Such software applications may include, for example, applications for editing software applications for creating and editing three dimensional ("3D") models, two dimensional ("2D") images, video content, drawings, and other types of content are in widespread use and are typically very feature rich. The richness of features is generally provided by an abundance of discrete units of functionality that are typically referred to as "tools." Many tools may exist, such as a paintbrush tool, a pencil tool, a bucket fill tool, and the like for image editing software applications, or tools for editing triangles and vertices for 3D model editing applications. While having a large number of tools is beneficial in that the tools provide a large range of functionality to a user, new users may have difficulty in learning to use a particular software application having such a large number of tools, due to the sheer complexity and numerosity of the tools.

Short video segments ("clips") that illustrate how a tool functions may be helpful for instructing a user on how to use that tool. For example, a particular video clip may illustrate an example use of a tool such as the paintbrush tool. A user that views that particular video clip would gain insight into the manner in which that particular tool should be applied while editing documents. Unfortunately, creating such clips for each tool in a software application may be very difficult and/or time consuming.

As the foregoing illustrates, what is needed in the art are techniques for more quickly generating tool instruction clips for user assistance.

SUMMARY OF THE INVENTION

Embodiments disclosed herein include a method, a non-transitory computer-readable medium, and a system for generating video clips for teaching how to apply a tools in various application programs for editing documents. The method includes identifying one or more characteristic features of a video clip. The method also includes providing the one or more characteristic features to a trained machine learning analysis module. The method further includes evaluating the characteristic features to generate a clip rating. The method also includes determining whether to discard the video clip based on the clip rating.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a more detailed illustration of the operation of clip recording module of FIG. 2, according to one embodiment of the present invention;

FIG. 3B illustrates operation of a clip segmentation module according to one embodiment of the present invention;

FIG. 3C is a graphical representation that illustrates the clip segmentation module generating an unevaluated clip from a single tool invocation, according to an embodiment of the present invention;

FIG. 3D is a graphical representation that illustrates the clip segmentation module generating an unevaluated clip from multiple tool invocations, according to an embodiment of the present invention;

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

System Overview

Figure 1:
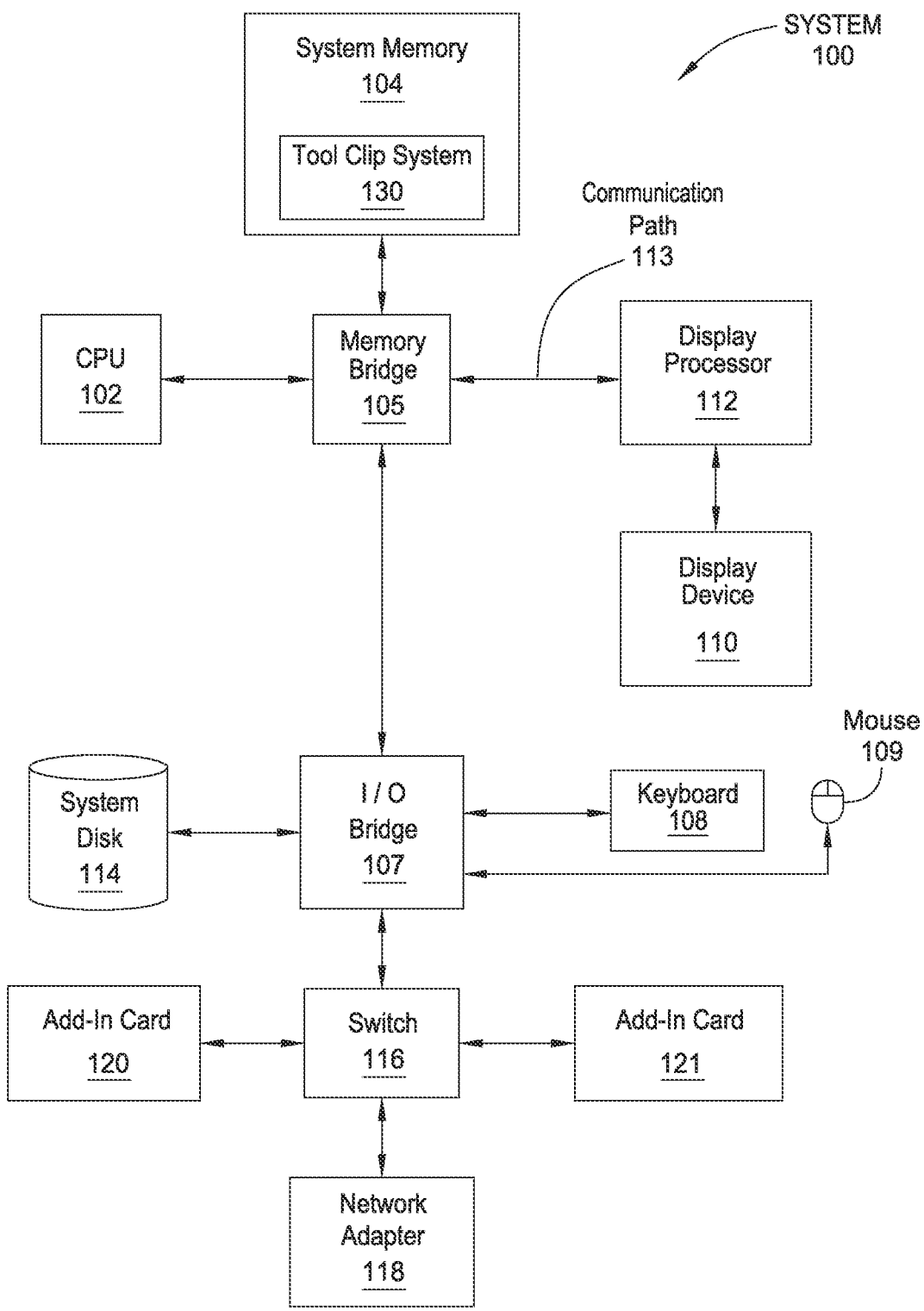
FIG. 1 is a block diagram of a computer system configured to implement one or more aspects of the present invention.

FIG. 1 is a block diagram of a computer system 100 configured to implement one or more aspects of the present invention. System 100 may be a computer workstation, personal computer, or any other device suitable for practicing one or more embodiments of the present invention. As shown, system 100 includes, without limitation, one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components.

System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices such as keyboard 108 or mouse 109 and forwards the input to CPU 102 via memory bridge 105. In alternative embodiments, I/O bridge 107 may also be connected to other input devices such as a joystick, digitizer tablets, touch pads, touch screens, still or video cameras, motion sensors, and/or microphones (not shown). Tool clip generation system 160 is stored in system memory 104 and is an application that generates tool clips, as shown in more detail in FIG. 2 and further explained with respect to FIGS. 3-6.

One or more display processors, such as display processor 112, are coupled to memory bridge 105 via a bus or other communication path 113 (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104. Display processor 112 periodically delivers pixels to a display device 110 that may be any conventional CRT or LED monitor. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or a graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 may be connected to CPU 102 directly rather than through a bridge, and other devices may communicate with system memory 104 via memory bridge 105 and CPU 102. In other alternative topologies display processor 112 may be connected to I/O bridge 107 or directly to CPU 102, rather than to memory bridge 105. In still other embodiments, I/O bridge 107 and memory bridge 105 may be integrated in a single chip. In addition, the particular components shown herein are optional. For instance, any number of add-in cards or peripheral devices might be supported. In some embodiments, switch 116 is eliminated, and network adapter 118 and add-in cards 120, 121 connect directly to I/O bridge 107.

Complex document editing applications typically have a steep learning curve due to having a large number of complex features for a user to learn. Short video segments (or "clips") that illustrate how to use particular functionality of such applications may help users learn how to edit documents with such applications. However, generating such clips manually may be time consuming. FIGS. 2-6 thus provide techniques for automatic generation of such clips.

Figure 2:
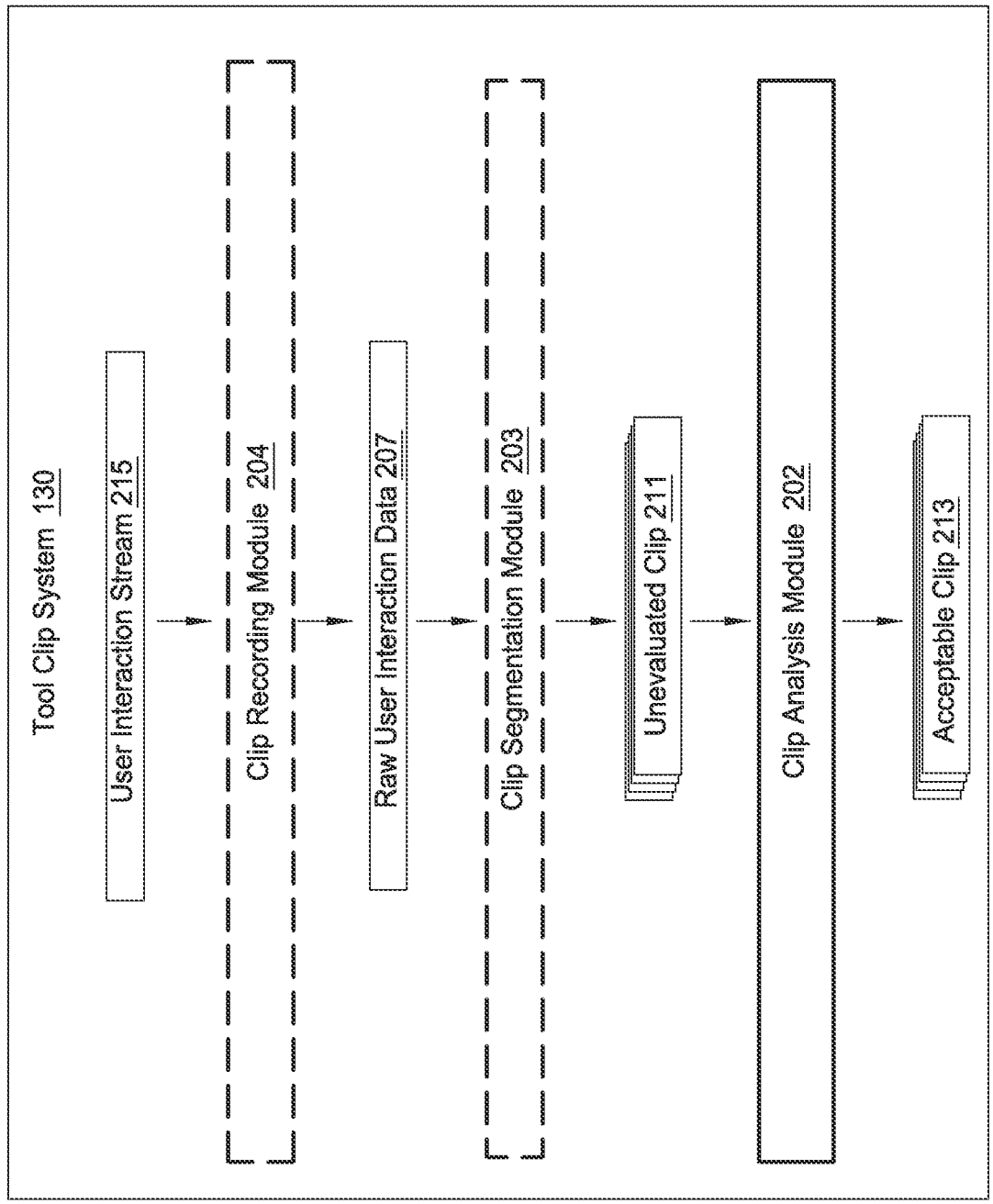
FIG. 2 is a more detailed illustration of the tool clip system of FIG. 1, according to one embodiment of the present invention.

FIG. 2 is a more detailed illustration of the tool clip system 130 of FIG. 1, according to one embodiment of the present invention. As shown, the tool clip system 130 includes, without limitation, a clip analysis module 202, an optional clip segmentation module 203, and an optional clip recording module 204. In general, tool clip system 130 analyzes raw user interaction data 207 (also referred to herein as "raw data 207") in order to generate acceptable clips 213 for assisting users with learning how to utilize a particular document editing application. These acceptable clips 213 generally constitute short segments of video data that illustrate techniques for using a particular tool. As used herein, and unless otherwise specified, references to "the tool" or the like, means the tool that is the subject of a particular clip. Acceptable clips (as opposed to unacceptable clips) are video clips that have been evaluated by clip analysis module 202 and have been deemed to be of "good" or "acceptable" quality in terms of how well such clips illustrate usage of a particular tool. Unacceptable clips are video clips that have been evaluated by clip analysis module 202 and have been deemed to be of unacceptable quality.

The clip recording module 204 and clip segmentation module 203 are considered optional because tool clip system 130 may receive raw data 207 from an external source, and may also receive unevaluated clips 211 from an external source, rather than recording or generating these items.

The optional clip recording module 204 records raw user interaction data 207. In various embodiments, this raw data 207 may include various types of metadata that characterizes a sequence of user input and may also include video data that shows the user performing the actions corresponding to the recorded metadata. Clip recording module 204 is described in more detail below with reference to FIG. 3A.

The clip segmentation module 203 accepts as input an indication of a tool for which clip generation is requested. For example, the clip segmentation module 203 may be requested to generate tool clips for a tool such as a "Brush" tool for an image editing software application. The clip segmentation module 203 analyzes the raw data 207 to generate unevaluated clips 211, based on the particular tool for which clip creation is requested.

More specifically, clip segmentation module 203 identifies portions of the raw data 207 that include invocations of tools for which clip creation is desired, identifies portions of the raw data immediately before and after the tool invocations, and creates an unevaluated clip 211 based on these identified portions. Clip segmentation module 203 may form a particular unevaluated clip 211 from several tool invocations if those tool invocations are close enough together in time. Clip segmentation module 203 is described in more detail below with respect to FIGS. 3B-3D.

The clip recording module 204 and the clip segmentation module 203 are optional in the tool clip generation system 130. More specifically, the tool clip system 130 may receive raw data 207 from an external source, in which case clip recording module 204 would not be present or would be disabled in tool clip system 130. Alternatively, tool clip system 130 may receive unevaluated clips 211 from an external source, in which case both clip recording module 204 and clip segmentation module 203 would be not present or would be disabled in tool clip system 130.

The clip analysis module 202 accepts unevaluated clips 211 and analyzes the unevaluated clips 211. Based on this analysis, clip analysis module 202 assigns either a rating of "good" or a rating of "poor" to each particular unevaluated clip 211 to generate acceptable clips 213. Acceptable clips 213 are clips that are assigned a "good" rating. Clip analysis module 202 discards clips that are assigned a rating of poor. The clip analysis module 202 performs as described in more detail below with respect to FIG. 4.

FIG. 3A is a more detailed illustration of the operation of clip recording module 204, according to one embodiment of the present invention. As shown, the clip recording module 204 receives data from a user interaction stream 215 and outputs raw user interaction data 207. The user interaction stream 215 comprises interactions of a user with an editing software application, such as mouse clicks, tool invocations, and the like. In various embodiments, the clip recording module 204 may be software, hardware, or a combination thereof. Further, the clip recording module 204 may be present at the physical location of a user—for example, software installed on a computer of that user—or may be remote from the user and may communicate with the user via a computer network.

The clip recording module 204 records raw user interaction data 207, which includes video data and/or metadata of the user interactions represented by the user interaction stream 215. In general, metadata constitutes data that describes the events that are involved in document creation and editing, as well as the timing for those events. The metadata may include information such as: mouse movement, mouse location, mouse clicks and releases, keyboard presses and releases, tool invocations with associated tool identification (in other words, metadata identifying a tool and the manner in which that tool is invoked), tool setting changes, dialog open and close events, changes to the undo stack, document snapshots after each change to the undo stack, changes to the selection state and the selection region, changes to the color palette and other associated data.

Mouse movement data and mouse location data comprise data that indicates location, velocity, acceleration, and associated timestamp information. In one example, mouse movement data may include an indication that a mouse was at a first location at a first time, at a second location at a second time, and at a third location at a third time. The velocity and acceleration may be derived from this data and recorded concurrently. Similarly, the mouse click and release data includes indications of which mouse buttons were pressed or released and at what time. Keyboard presses and releases include indications of what keys were pressed and released and at what time. Tool invocations and tool identification data include data that indicates which tool is activated and at what time. Tool setting changes include indications of tool settings, including what the tool settings are changed from and to, and may include timestamp data indicating when such settings changes were made.

Dialog open and close events include indications of what dialog box is opened and closed as well as the time at which these events occurred. The undo stack is a stack data structure that stores edits that a user makes to a document. Changes to the undo stack thus include changes to that stack data structure. Such changes may be made, for example, when a user executes an undo command, a redo command, or makes an edit to the document. Document snapshots after each change to the undo stack of course include the state of the document, recorded after each change to the undo stack. Changes to the selection state and selection region include actions that cause the selected portion of the document to change. Finally, changes to the color palette include changes that are made to the color palette of the document.

In addition to recording the above metadata items, tool clip system 130 may calculate any of the following additional items based on the above metadata items: number of pixels of an image changed, percentage of pixels in an image changed, start entropy, end entropy, entropy change, number of pixels in a viewport, median zoom level, percent of image selected, entropy of selection mask, mouse idle time, mouse button down time, number of mouse clicks, mouse bounding box, total clip duration, percent of pre-tool time, percent of tool time, number of tool invocations, number of other tools shown in the clip, and number of settings changed.

Number of pixels changed and percentage of pixels changed constitutes how many pixels are changed in a particular clip based on the events within that clip. Start entropy, end entropy, entropy change, and entropy of a selection mask indicate information about image entropy, which, as is generally known, represents the "busy-ness" of an image, or, in other words, how much information would be included in a compressed version of the image. Mouse idle time indicates how much time the mouse is not moving. Mouse button down time indicates how much time a particular mouse button is down. The number of pixels in a viewport indicates how many pixels are displayed in the viewport throughout the length of a particular clip. The viewport is the area of an application in which a user makes document edits. This number includes all pixels that are shown in the viewport throughout the length of the clip. The number of pixels may change, for example, if a user zooms in (fewer pixels) or out (more pixels) or pans the image. The median zoom level is self-explanatory and indicates the median zoom level throughout the length of a clip. The total clip duration is also self explanatory and indicates the total length in time of the clip. The percent of pre-tool time indicates the percentage of the total clip length that constitutes the clip prior to the first tool invocation. The mouse bounding box is the total areal extent in which the mouse moves during the clip. The percent of tool time is the percentage of the total length of the clip during which the tool is being performed. The number of tool invocations is the number of tool invocations of the tool type that is associated with clip that are recorded in the clip. The number of other tools shown in the clip is the number of tools that are not the subject of the clip that are nevertheless within the clip. The number of settings changed is the number of settings for the tool that is the subject of the clip that are changed during the clip.

For any of the foregoing metadata items, timestamp data may also be recorded. Timestamp data generally constitutes an indication of a time at which the particular action is performed.

FIG. 3B illustrates operation of a clip segmentation module 203 according to one embodiment of the present invention. Clip segmentation module 203 receives raw user interaction data and metadata 207 ("raw data 207"). This raw data 207 may be received from the clip recording module 204 or may be received from another source such as a remote or local data store.

Clip segmentation module 203 partitions raw data 207 into unevaluated clips 211, where each unevaluated clip 211 is designed to illustrate the use of a particular tool. To partition the raw data 207 in this manner, clip segmentation module 203 searches through raw data 207 for invocations of the particular tool that is to be the subject of the unevaluated clip 211. In one example, clip segmentation module 203 searches through raw data 207 for invocations of a "brush" tool. When clip segmentation module 203 finds a tool invocation, clip segmentation module 203 begins forming a new unevaluated clip 211. If clip segmentation module 203 finds a subsequent tool invocation of the same type (e.g., "brush") within a particular amount of time (a "consecutive invocation period") from the end of the already-found tool invocation, clip segmentation module 203 adds that subsequent tool invocation to the unevaluated clip 211. Clip segmentation module 203 searches through the raw data 207 for tool invocations that are within the consecutive invocation period from the end of the most-recently found tool invocation, adding each such found tool invocation to the unevaluated clip. When clip segmentation module 203 does not find a tool invocation with the consecutive invocation period from the end of the most-recently found tool invocation, clip segmentation module 203 stops adding new tool invocations to the unevaluated clip 211. Thus, depending on how close in time invocations of the tool are found, clip segmentation module 203 may either form an unevaluated clip 211 for one particular tool invocation or may form an unevaluated clip 211 for multiple invocations of the tool.

After clip segmentation module 203 determines that no additional tool invocations are to be added to the unevaluated clip 211, clip segmentation module 203 searches backwards in time from the first tool invocation in the unevaluated clip 211 up to an amount of time equal to a tool selection period 333 in order to find a tool selection corresponding to the tool that is the subject of the unevaluated clip 211. A tool selection constitutes an indication that a user selected that tool. If such a tool selection is found, then that tool selection is added to the clip and if not, then no tool selection is added to the clip.

Once a tool selection is added or not added, data before the first tool invocation and after the last tool invocation are also added to the clip. Before the first tool invocation, clip segmentation module 203 adds data in a pre-tool period to the clip. If a tool selection is included in the clip, then the pre-tool period extends backwards from the tool selection. This addition provides some "context" to the clip so that a person viewing the clip can see events prior to the first tool invocation. After the last tool invocation, clip segmentation module 203 adds data in a post-tool period to the clip so that, again, some "context" is provided to the clip.

At this point, one or more tool invocations are included in the clip and the pre- and post-tool periods are added to the clip. The clip now includes metadata and/or video data corresponding to this whole clip period. Note that although clip segmentation module 203 adds tool invocations of a particular tool type to the clip, tool invocations of other types may be included in the unevaluated clip 211 if those tool invocations happen to fall within the start and end times of that unevaluated clip 211. FIGS. 3C and 3D illustrate examples of the above-described segmentation process.

FIG. 3C is a graphical representation 330 that illustrates the clip segmentation module 203 generating an unevaluated clip 211 from a single tool invocation, according to an embodiment of the present invention. As described above, the clip segmentation module 203 identifies a tool invocation 340(1) and determines that no additional tool invocations of the same type as tool invocation 340(1) exists within a consecutive invocation period 335. Thus, clip segmentation module 203 includes the tool invocation 340(1) but no other tool invocations in the unevaluated clip 211. A tool invocation 340(2) of the same type as tool invocation 340(1) is shown but is not within the consecutive invocation period 335. Thus, tool invocation 340(2) is not included in the unevaluated clip 211.

The clip segmentation module 203 also looks back in time from the beginning of the included tool invocation 340(1) for a tool selection period 333. Clip segmentation module 203 finds a tool selection 205, which is an indication that a user selected the tool that is being recorded in the unevaluated clip 211, within that tool selection period 333, and adds the tool selection 205 to the unevaluated clip 211. Clip segmentation module 203 also includes data for a pre-tool period 332 to the unevaluated clip 211 and includes data for a post-tool period 334 to the unevaluated clip 211. Note that although no additional tool invocations of the same type as tool invocation 340(1) are included in unevaluated clip 211, tool invocations of other types may be included in unevaluated clip 211. In one example, tool invocation 340(1) is a "brush" type tool. Another tool invocation of a bucket fill tool may be included in the unevaluated clip 211 if that tool invocation happens to be within the time period recorded in the unevaluated clip 211.

FIG. 3D is a graphical representation 360 that illustrates the clip segmentation module 203 generating an unevaluated clip 211 from multiple tool invocations, according to an embodiment of the present invention. The clip segmentation module 203 identifies a tool invocation 340(3) and determines that within a consecutive invocation period 305, another tool invocation 340(4) of the same tool type exists, and adds that tool invocation 340(4) to the unevaluated clip 211. The clip segmentation module 203 determines that no additional tool invocations of the same type exist within a consecutive invocation period 335 past the second tool invocation 340(4) and thus adds no more tool invocations 340 to the clip. The clip segmentation module 203 looks back in time from the beginning of the first tool invocation 340(3) for a tool selection period 333. Clip segmentation module 203 finds a tool selection 205, which is an indication that a user selected the tool that is being recorded in the unevaluated clip 211, within that tool selection period 333, and adds the tool selection 205 to the unevaluated clip 211. Clip segmentation module 203 also includes data for a pre-tool period 332 to the unevaluated clip 211 and includes data for a post-tool period 334 to the unevaluated clip 211.

Figure 4:
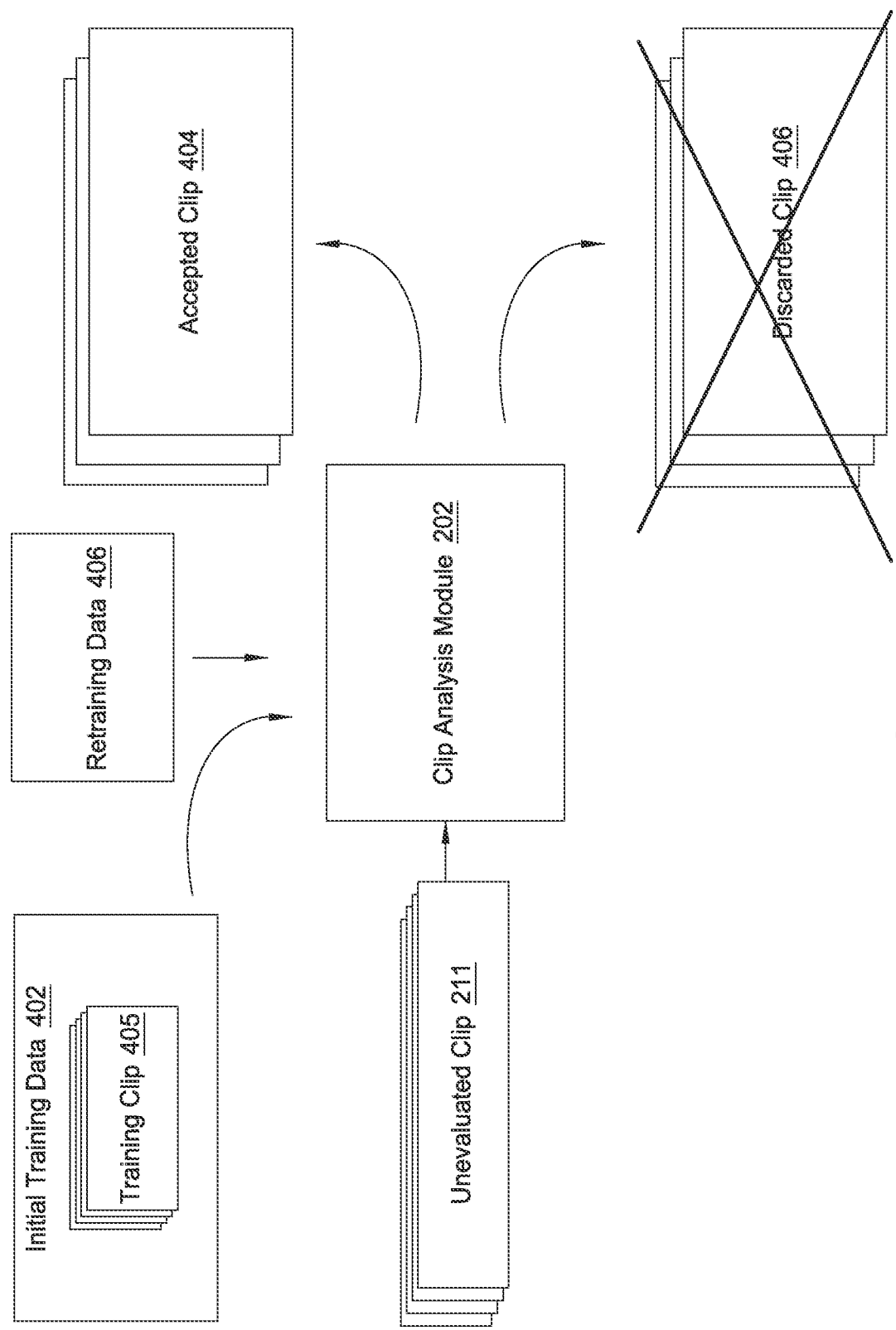
FIG. 4 illustrates the operation of the clip analysis module of FIG. 2, according to one embodiment of the present invention.

FIG. 4 illustrates the operation of a clip analysis module 202 of FIG. 2, according to one embodiment of the present invention. Clip analysis module 202 receives unevaluated clip 211 and analyzes the unevaluated clip 211 for "fitness." More specifically, clip analysis module 202 determines whether a particular unevaluated clip 211 is deemed to be of high quality (also referred to as "good") for providing help information to a user. Clip analysis module 202 discards unevaluated clips 211 that are not deemed to be of high quality (also referred to herein as "low quality" or "poor"), thus producing discarded clips 406 from input unevaluated clips 211. Clip analysis module 202 accepts and thus does not discard clips 206 that are deemed to be of high quality, thus producing accepted clips 404. These accepted clips 404 constitute the "acceptable clips 213" of FIG. 2.

In general, the clip analysis module 202 performs computer learning techniques to classify individual unevaluated clips 211 as either good or poor. To perform the computer learning techniques, clip analysis module 202 begins with an initial data set 402 to train clip analysis module 202. The initial data set 402 may be a data set that includes a plurality of training clips 405 that each includes similar information as unevaluated clips 211. Each training clip 405 also includes an associated clip evaluation. For each training clip 405, the clip evaluation is an indication of whether that training clip 405 is considered "good" or "poor."

Training the clip analysis module 202 means causing the clip analysis module 202 to process the initial training data 402 in order to initially configure the clip analysis module 202 to be able to evaluate unevaluated clips 211 as good or poor. More specifically, training the clip analysis module 202 causes the clip analysis module 202 to create and/or refine an internal model based on the initial training data 402, where the internal model "informs" the ability of the clip analysis module 202 to discern good clips from poor clips.

The clip analysis module 202 may perform any machine learning procedure to be trained and then evaluate unevaluated clips 211. In one embodiment, clip analysis module 202 includes a support vector machine classifier. With such an embodiment, the cost and gamma parameters may be tuned using grid search with the $F_{0.5}$ score as an objective function. This objective function is chosen to bias the recognizer toward higher precision (fewer false positives) at the cost of lower recall (more false negatives), with the rationale that rejecting some good clips is better than classifying poor clips as good. The support vector machine classifier would be trained according to the initial training data 402.

Each training clip 405 includes clip data and an associated rating. In some embodiments, the initial data set 402 is obtained from one or more users who manually view each training clip 405 and rate the training clip 405 as either "good" or "poor." As with the unevaluated clips 211, each training clip 405 includes metadata and/or video data. Each training clip 405 also includes a rating of either good or poor for the clip. Certain metadata may be extracted from each training clip 405. Such metadata may include one or more of the following items of information: number of pixels of an image changed, percentage of pixels in an image changed, start entropy, end entropy, entropy change, number of pixels in a viewport, median zoom level, percent of image selected, entropy of selection mask, mouse idle time, mouse button down time, number of mouse clicks, mouse bounding box, total clip duration, percent of pre-tool time, percent of tool time, number of tool invocations, number of other tools shown in the clip, and number of settings changed. The clip analysis module 202 performs machine learning based on this metadata information. This information is described in more detail above.

After being trained, clip analysis module 202 accepts unevaluated clips 211 and evaluates those unevaluated clips 211 based on the training already performed. The clip analysis module 202 evaluates the unevaluated clips 211 based on the metadata items mentioned above. More specifically, the clip analysis module 202 evaluates a particular unevaluated clip 211 by analyzing the data (such as the above-mentioned metadata) included in the unevaluated clip 211 according to the internal model of the clip analysis module 202 to classify the unevaluated clip as either good or poor. The clip analysis module 202 discards poor clips (which are shown as discarded clips 406) and keeps good clips (which are shown as accepted clips 404).

The techniques described herein may mention features related to image editing software. Those of ordinary skill in the art will understand that although image editing software is one example for which tool clips can be evaluated, clips may be created for any application for editing data, such as three-dimensional computer-aided design applications, video editing applications, text document applications, drawing applications, spreadsheet applications, and other, different types of applications.

Figure 5:
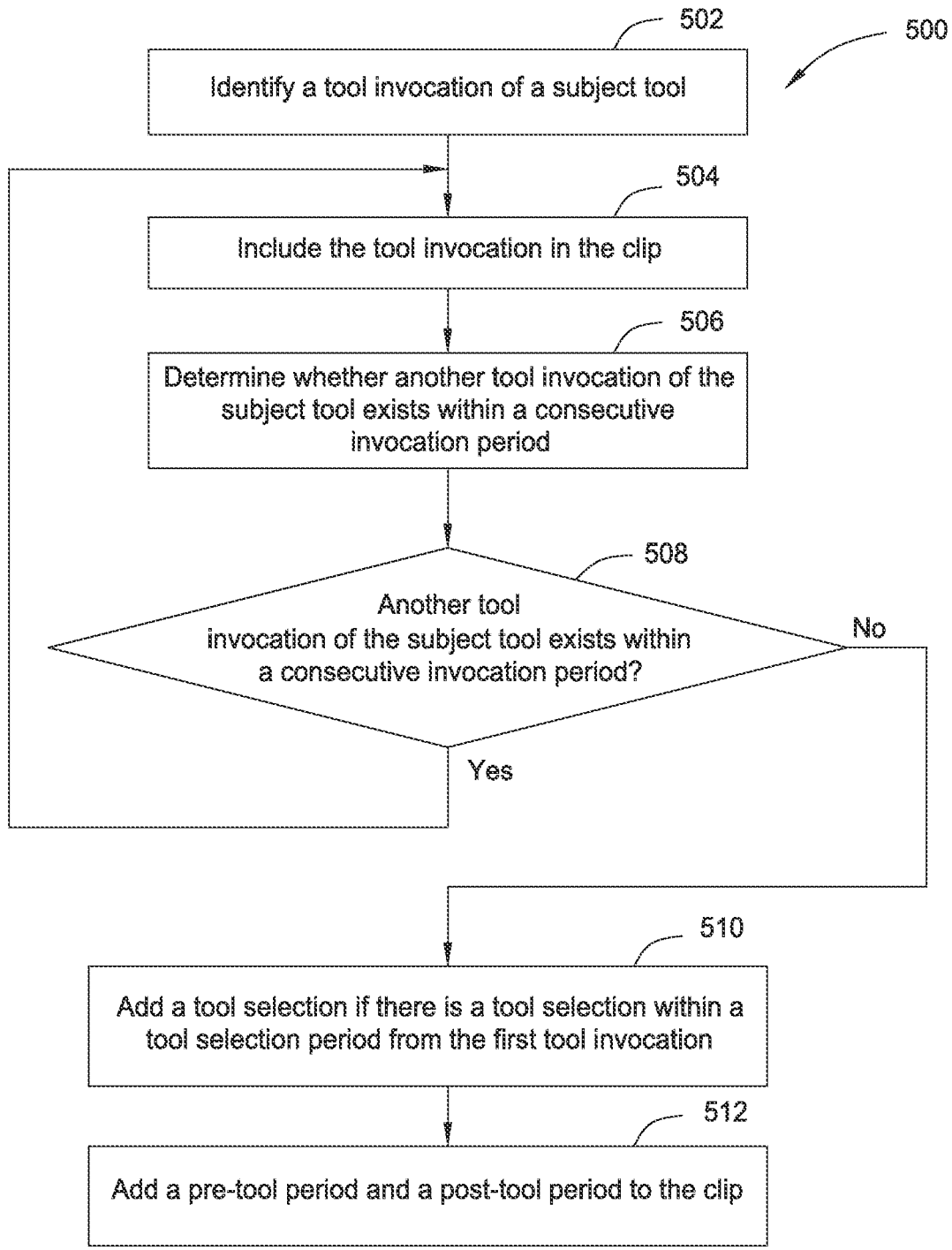
FIG. 5 is a flow diagram of method steps for segmenting raw data to generate unevaluated video clips, according to one embodiment of the present invention.

FIG. 5 is a flow diagram of method steps for segmenting raw data to generate unevaluated video clips, according to one embodiment of the present invention. Although the method steps are described in conjunction with the systems of FIGS. 1-4, persons skilled in the art will understand that any system configured to perform the method steps, in any order, falls within the scope of the present invention.

As shown, a method 500 begins at step 502, where the clip segmentation module 203 identifies a tool invocation of a subject tool. As described above, a subject tool is a tool for which the clip is being generated. In step 504, the clip segmentation module 203 includes the tool invocation in the clip. In step 506, the tool invocation module 203 determines whether another tool invocation of the subject tool exists within a consecutive invocation period. At step 508, if the tool invocation module 203 determines that another tool invocation of the subject tool exists within the consecutive invocation period, then the method returns to step 504. At step 508, if the tool invocation module 203 determines that another tool invocation of the subject tool does not exist within the consecutive invocation period, then the method proceeds to step 510. At step 510, the clip segmentation module 203 adds a tool selection if there is a tool selection within a tool selection period from the first tool invocation in the clip. At step 512, the clip segmentation module 203 adds a pre-tool period and a post-tool period to the clip.

Figure 6:
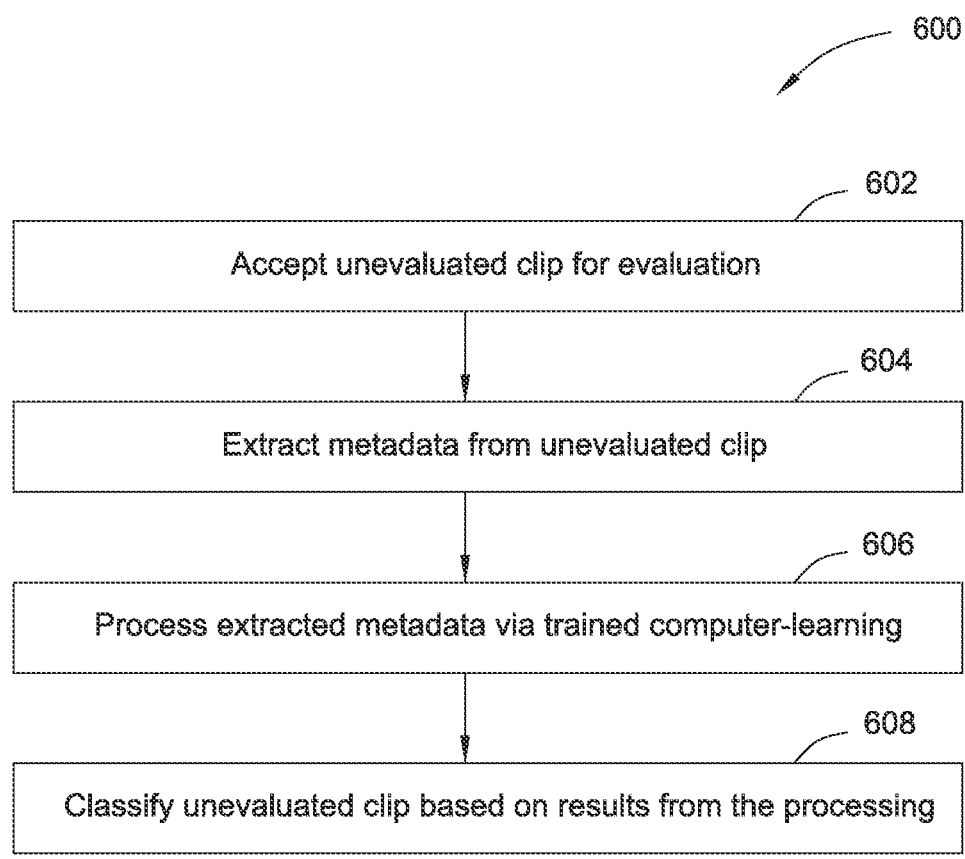
FIG. 6 is a flow diagram of method steps for evaluating unevaluated video clips, according to one embodiment of the present invention.

FIG. 6 is a flow diagram of method steps for evaluating unevaluated clips 211, according to one embodiment of the present invention. Although the method steps are described in conjunction with FIGS. 1-4, persons skilled in the art will understand that any system configured to perform the method steps, in any order, falls within the scope of the present invention.

As shown, a method 600 begins at step 602, in which clip analysis module 202 accepts an unevaluated clip 211 for evaluation. At step 604, the clip analysis module 202 extracts metadata from the unevaluated clip 211. The metadata may include any information that characterizes the events that occur within the unevaluated clip 211. At step 606, the clip analysis module 202 processes extracted metadata via trained computer-learning. This computer-learning may be trained with training clips that include similar types of metadata to the metadata extracted from the unevaluated clip 211. Training may be accomplished with any known conventional or technically feasible approach. At step 608, the clip analysis module 202 classifies the unevaluated clip 211 based on the processing as either "good" or "poor." Unevaluated clips 211 may be discarded or kept based on this classification.

In sum, techniques are provided for generating clips for illustrating usage of a tool. The techniques generally include training a clip analysis module that implements machine learning techniques to distinguish between "good" and "poor" clips with a set of training clips. This training process configures an internal model of the clip analysis module in order to perform such distinguishing operations. Once trained, the clip analysis module accepts unevaluated clips for evaluation based on the internal model of the clip analysis module. The techniques disclosed herein may also include recording raw data and segmenting the raw data into the unevaluated clips. Recoding the raw data generally includes recording metadata and/or video data that represent a set of user interactions. Segmenting the raw data generally includes identifying a particular tool type with which to form clips, identifying a tool invocation of that tool type in the raw data, and adding the tool invocation to a clip. Segmenting the raw data also includes finding additional tool invocations of the same type within a consecutive invocation period from the last tool invocation added to the clip, adding such found clips to the clip, and repeating this search and addition for more tool invocations, if present. Segmentation also includes identifying a tool selection prior to the first tool invocation and adding that tool selection to the clip if present. Segmentation also includes adding a data in a pre-tool period and adding data in a post-tool period to the clip.

One advantage of the disclosed technique is that clips are automatically evaluated that illustrate usage of a particular tool. Automatically generating such clips reduces the time and cost that a developer spends to evaluate clips for providing help to users. Another advantage is that clips are segmented automatically as well, which, again, reduces the time and cost that a developer spends to generate such segmented clips.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A method for evaluating user interaction data, comprising:
  receiving an identification of an application tool used to edit documents via a first software application;
  receiving raw user interaction data associated with editing a first document via the first software application, wherein the raw user interaction data comprises video data and metadata;
  generating a first clip based on the raw user interaction data, by:
    identifying one or more pairs of application tool invocation timestamps, wherein the application tool invocation timestamps within a given pair are within a predetermined time of one another, by searching for invocations of the application tool in the metadata, and
    in response to identifying the one or more pairs of application tool invocation timestamps, forming the first clip by concatenating a plurality of segments of the raw user interaction data corresponding to the one or more pairs of application tool invocation timestamps;
  inputting the first clip into a trained machine learning analysis module;
  generating, by the trained machine learning analysis module, a clip rating for the first clip by analyzing one or more characteristic features of the first clip; and
  determining whether to discard the first clip based on the clip rating.

2. The method of claim 1, wherein receiving the raw user interaction data comprises acquiring the raw user interaction data via a raw data recorder embedded in the first software application that is configured for editing a document while acquiring the raw user interaction data.

3. The method of claim 1, wherein generating the first clip based on the raw user interaction data further comprises:
  identifying a second application tool invocation from within the raw user interaction data that is within a consecutive invocation period from a first application tool invocation timestamp; and
  adding the second application tool invocation to the first clip.

4. The method of claim 1, wherein generating the first clip based on the raw user interaction data further comprises adding a pre-tool period and a post-tool period to the first clip.

5. The method of claim 1, wherein generating the first clip based on the raw user interaction data further comprises adding a tool selection to the first clip.

6. The method of claim 1, further comprising providing training data to an untrained machine learning analysis module to convert the untrained machine learning analysis module to the trained machine learning analysis module.

7. The method of claim 1, wherein the characteristic features include one or more of a number of pixels of an image associated with the first clip changed, a percentage of pixels of the image changed, an entropy change of the image, a median zoom level in the first clip, or a percent of the image selected in the first clip.

8. One or more non-transitory computer-readable media including instructions that, when executed by one or more processors, cause the one or more processors to perform a method for evaluating user interaction data, the method comprising:
  receiving an identification of an application tool used to edit documents via a first software application;
  receiving raw user interaction data associated with editing a first document via the first software application, wherein the raw user interaction data comprises video data and metadata;
  generating a first clip based on the raw user interaction data, by:
    identifying one or more pairs of application tool invocation timestamps, wherein the application tool invocation timestamps within a given pair are within a predetermined time of one another, by searching for invocations of the application tool in the metadata, and
    in response to identifying the one or more pairs of application tool invocation timestamps, forming the first clip by concatenating a plurality of segments of the raw user interaction data corresponding to the one or more pairs of application tool invocation timestamps;
  inputting the first clip into a trained machine learning analysis module;
  generating, by the trained machine learning analysis module, a clip rating for the first clip by analyzing one or more characteristic features of the first clip; and
  determining whether to discard the first clip based on the clip rating.

9. The one or more non-transitory computer-readable media of claim 8, wherein receiving the raw user interaction data comprises acquiring the raw user interaction data via a raw data recorder embedded in the first software application that is configured for editing a document while acquiring the raw user interaction data.

10. The one or more non-transitory computer-readable media of claim 8, wherein generating the first clip based on the raw user interaction data further comprises:
  identifying a second application tool invocation from within the raw user interaction data that is within a consecutive invocation period from a first application tool invocation timestamp; and
  adding the second application tool invocation to the first clip.

11. The one or more non-transitory computer-readable media of claim 8, wherein generating the first clip based on the raw user interaction data further comprises adding a pre-tool period and a post-tool period to the first clip.

12. The one or more non-transitory computer-readable media of claim 8, wherein generating the first clip based on the raw user interaction data further comprises adding a tool selection to the first clip.

13. The one or more non-transitory computer-readable media of claim 8, wherein the method further comprises providing training data to an untrained machine learning analysis module to convert the untrained machine learning analysis module to the trained machine learning analysis module.

14. The one or more non-transitory computer-readable media of claim 8, wherein the characteristic features include one or more of a number of pixels of an image associated with the first clip changed, a percentage of pixels of the image changed, an entropy change of the image, a median zoom level in the first clip, or a percent of the image selected in the first clip.

15. The one or more non-transitory computer-readable media of claim 8, wherein the method further comprises:
provided training data to an untrained machine learning analysis module, wherein the training data includes a plurality of clips, and each clip included in the plurality of clips includes clip data and a predetermined clip rating; and
training a support vector machine classifier to generate an internal model based on the training data, wherein the training converts the untrained machine learning analysis module to the trained machine learning analysis module.

16. A system for evaluating user interaction data, the system comprising:
one or more processors, configured to:
receive an identification of an application tool used to edit documents via a first software application;
receive raw user interaction data associated with editing a first document via the first software application, wherein the raw user interaction data comprises video data and metadata;
generate a first clip based on the raw user interaction data, by:
identifying one or more pairs of application tool invocation timestamps, wherein the application tool invocation timestamps within a given pair are within a predetermined time of one another, by searching for invocations of the application tool in the metadata, and
in response to identifying the one or more pairs of application tool invocation timestamps, forming the first clip by concatenating a plurality of segments of the raw user interaction data corresponding to the one or more pairs of application tool invocation timestamps;
input the first clip into a trained machine learning analysis module;
generate, by the trained machine learning analysis module, a clip rating for the first clip by analyzing one or more characteristic features of the first clip; and
determine whether to discard the first clip based on the clip rating.

* * * * *